(12) United States Patent
Shingai et al.

(10) Patent No.: US 11,905,425 B2
(45) Date of Patent: Feb. 20, 2024

(54) INKJET ACTIVE-ENERGY-RAY-CURABLE COMPOSITION, THREE-DIMENSIONAL OBJECT PRODUCING METHOD, AND THREE-DIMENSIONAL OBJECT PRODUCING APPARATUS

(71) Applicants: Yuki Shingai, Kanagawa (JP); Hiroyuki Naito, Tokyo (JP); Keisuke Shiba, Kanagawa (JP)

(72) Inventors: Yuki Shingai, Kanagawa (JP); Hiroyuki Naito, Tokyo (JP); Keisuke Shiba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/654,586

(22) Filed: Mar. 12, 2022

(65) Prior Publication Data
US 2022/0306880 A1 Sep. 29, 2022

(30) Foreign Application Priority Data
Mar. 23, 2021 (JP) .................................. 2021-048508

(51) Int. Cl.
| | |
|---|---|
| *B33Y 70/00* | (2020.01) |
| *C09D 11/322* | (2014.01) |
| *B33Y 10/00* | (2015.01) |
| *B33Y 30/00* | (2015.01) |
| *B29C 64/112* | (2017.01) |
| *C09D 11/033* | (2014.01) |
| *C09D 11/101* | (2014.01) |
| *C09D 11/107* | (2014.01) |
| *B29K 105/00* | (2006.01) |
| *B29K 105/16* | (2006.01) |

(52) U.S. Cl.
CPC .......... *C09D 11/322* (2013.01); *B29C 64/112* (2017.08); *B33Y 10/00* (2014.12); *B33Y 30/00* (2014.12); *B33Y 70/00* (2014.12); *C09D 11/033* (2013.01); *C09D 11/101* (2013.01); *C09D 11/107* (2013.01); *B29K 2105/0002* (2013.01); *B29K 2105/16* (2013.01)

(58) Field of Classification Search
None
See application file for complete search history.

(56) References Cited

U.S. PATENT DOCUMENTS

| | | |
|---|---|---|
| 2007/0116311 A1 | 5/2007 | Litke et al. |
| 2014/0167300 A1 | 6/2014 | Lee |

(Continued)

FOREIGN PATENT DOCUMENTS

| | | |
|---|---|---|
| EP | 1 788 009 | 5/2007 |
| EP | 3 572 874 | 11/2019 |

(Continued)

OTHER PUBLICATIONS

Technical Data Sheet of SR231 of Sartomer, www.arkema.com.*
(Continued)

*Primary Examiner* — Mohammad M Ameen
(74) *Attorney, Agent, or Firm* — Grüneberg and Myers, PLLC (57) ABSTRACT

Provided is an inkjet active-energy-ray-curable composition including a bisphenol-type methacrylate, a low-viscosity monomer, and an inorganic filler.

17 Claims, 1 Drawing Sheet

(56) References Cited

U.S. PATENT DOCUMENTS

| | | | |
|---|---|---|---|
| 2014/0239527 A1* | 8/2014 | Lee | B29C 64/106 |
| | | | 264/17 |
| 2016/0324730 A1 | 11/2016 | Lee | |
| 2020/0079966 A1 | 3/2020 | Holt et al. | |
| 2022/0111585 A1 | 4/2022 | Hirschsohn et al. | |

FOREIGN PATENT DOCUMENTS

| | | |
|---|---|---|
| EP | 3885412 A1 | 9/2021 |
| JP | 2017-160405 | 9/2017 |
| JP | 2021-147581 | 9/2021 |
| WO | 2014/172716 A1 | 10/2014 |
| WO | 2014/172716 A4 | 12/2014 |
| WO | 2020/136654 A1 | 7/2020 |
| WO | 2020/136654 A8 | 9/2020 |

OTHER PUBLICATIONS

Technical Data Sheet of SR540 of Sartomer, www.arkema.com.*
Mariola Sadej et al.: "Photocurable polymethacrylate-silica nanocomposites: correlation between dispersion stability, curing kinetics, morphology and properties", J. Polym Res (2016) 23: 116 (Year: 2016).*
Extended European Search Report received for European Patent Application No. 22161806.9, dated Aug. 9, 2022, 6 pages.

\* cited by examiner

INKJET ACTIVE-ENERGY-RAY-CURABLE COMPOSITION, THREE-DIMENSIONAL OBJECT PRODUCING METHOD, AND THREE-DIMENSIONAL OBJECT PRODUCING APPARATUS

CROSS-REFERENCE TO RELATED APPLICATIONS

The present application claims priority under 35 U.S.C. § 119 to Japanese Patent Application No. 2021-048508 filed Mar. 23, 2021. The contents of which are incorporated herein by reference in their entirety.

BACKGROUND OF THE INVENTION

Field of the Invention

The present disclosure relates to an inkjet active-energy-ray-curable composition, a three-dimensional object producing method, and a three-dimensional object producing apparatus.

Description of the Related Art

In recent years, material jetting methods (hereinafter, may be referred to as "MJ methods") that locate active-energy-ray-curable compositions at needed positions using inkjet heads and cure the located active-energy-ray-curable compositions using, for example, light irradiators, to produce three-dimensional stereoscopic objects have been paid attention among three-dimensional additive manufacturing techniques.

In the MJ methods, cured products of active-energy-ray-curable compositions need to have various properties such as strength, hardness, and elastic modulus. As the method for improving these properties, a method of adding inorganic fillers in the active-energy-ray-curable compositions is being attempted. Adaptation to biological materials represented by dental materials is also being explored, and it is necessary to design active-energy-ray-curable compositions, using biocompatible monomers.

For example, a proposed active-energy-ray-curable composition contains a monofunctional polymerizable monomer containing one ethylenic unsaturated double bond, and inorganic particles containing a reactive organic group, wherein the content of the monofunctional monomer is 80% by mass or greater relative to the total amount of polymerizable compounds, and the reactive organic group of the inorganic particles contains an ethylenic unsaturated double bond (for example, see Japanese Unexamined Patent Application Publication No. 2017-160405).

As a monomer component having a high biocompatibility, for example, bisphenol A diglycidyl methacrylate (Bis-GMA) is used in order to increase hardness and elastic modulus.

SUMMARY OF THE INVENTION

According to an embodiment of the present disclosure, an inkjet active-energy-ray-curable composition contains a bisphenol-type methacrylate, a low-viscosity monomer, and an inorganic filler.

DESCRIPTION OF THE EMBODIMENTS (Inkjet Active-Energy-Ray-Curable Composition)

An inkjet active-energy-ray-curable composition of the present disclosure contains bisphenol-type methacrylate, a low-viscosity monomer, and an inorganic filler, and further contains other components as needed.

The present disclosure has an object to provide an inkjet active-energy-ray-curable composition that has a good inkjet dischargeability and can produce a cured product having a high elastic modulus, a high strength, and a high hardness.

The present disclosure can provide an inkjet active-energy-ray-curable composition that has a good inkjet dischargeability and can produce a cured product having a high elastic modulus, a high strength, and a high hardness.

An "inkjet active-energy-ray-curable composition" is a composition that is discharged by an inkjet method, and cures and forms a cured product when irradiated with active energy rays.

In the present disclosure, "curing" means "forming a polymer". However, "curing" is not limited to "solidifying", but also includes "thickening" and "simultaneous solidifying and thickening".

A "solidified product (cured product)" means a polymer, but is not limited to a solid and also includes a thickened product and a mixture of a solid and a thickened product.

Existing techniques have a problem that active-energy-ray-curable compositions significantly thicken when an inorganic filler is added in the compositions at a high concentration, and are difficult to discharge by an inkjet method.

Moreover, when an inorganic filler for improving hardness is further added in an active-energy-ray-curable composition in addition to bisphenol A diglycidyl methacrylate (Bis-GMA), which is an existing monomer component having a high biocompatibility and a high viscosity of 1,200,000 mPa·s at 25 degrees C., it is difficult to realize a viscosity of an inkjet-dischargeable level even if the active-energy-ray-curable composition is diluted with a diluent, whereas the content ratio of the Bis-GMA in the active-energy-ray-curable composition becomes low if the amount of addition of the diluent is extremely increased, making it difficult for a curing reaction to proceed.

The inkjet active-energy-ray-curable composition of the present disclosure containing bisphenol-type methacrylate, a low-viscosity monomer, and an inorganic filler has an optimum monomer component composition that ensures a low viscosity even if the concentration of the inorganic filler is high. Therefore, the inkjet active-energy-ray-curable composition has a good inkjet dischargeability and can produce a cured product that has a high elastic modulus, a high strength, and a high hardness regardless of the positions of layers laminated. i.e., whether layers are upper layers or bottom layers in the layer lamination direction.

The inkjet active-energy-ray-curable composition of the present disclosure contains monomer components including a bisphenol-type methacrylate and a low-viscosity monomer, and an inorganic filler, preferably contains a polymerization initiator, and further contains other components as needed.

<Monomer Components>

The monomer components include a bisphenol-type methacrylate and a low-viscosity monomer, and further include other monomers as needed.

—Bisphenol-Type Methacrylate—

Examples of the bisphenol-type methacrylate include bisphenol A-type methacrylate, bisphenol F-type methacrylate, and bisphenol S-type methacrylate. Among these bisphenol-type methacrylates, bisphenol A-type methacrylate is preferable in terms of easy availability and mechanical properties of a cured product.

Examples of the bisphenol A-type methacrylate include bisphenol A-type monomethacrylate, bisphenol A-type dimethacrylate, and bisphenol A-type trifunctional or higher methacrylates. Among these bisphenol A-type methacrylates, bisphenol A-type dimethacrylate is preferable in terms of easy availability and mechanical properties of a cured product.

Examples of the bisphenol A-type dimethacrylate include ethoxylated bisphenol A dimethacrylate. Among these bisphenol A-type dimethacrylates, ethoxylated bisphenol A-type dimethacrylate having a viscosity of 2,000 mPa·s or lower at 25 degrees C. is preferable.

The viscosity at 25 degrees C. can be measured by a routine method. For example, the viscosity at 25 degrees C. can be measured with, for example, a cone plate rotary viscometer VISCOMETER TVE-22L available from Toki Sangyo Co., Ltd. using a cone rotor (1°34'×R24) at a rotation number of 50 rpm at a hemathermal circulating water temperature of 25 degrees C.

A commercially available product can be used as the ethoxylated bisphenol A-type dimethacrylate having a viscosity of 2,000 mPa·s or lower at 25 degrees C. Examples of the commercially available product include BPE-100/D-2.6E (available from Shin-Nakamura Chemical Co., Ltd.), and BPE-500 (available from Shin-Nakamura Chemical Co., Ltd.).

The content of the bisphenol-type methacrylate is preferably 10% by mass or greater but 80% by mass or less and more preferably 20% by mass or greater but 70% by mass or less relative to the total amount of the inkjet active-energy-ray-curable composition.

—Low-Viscosity Monomer—

In the present disclosure, a low-viscosity monomer means a methacrylate having a viscosity of 100 mPa·s or lower at 25 degrees C.

The viscosity at 25 degrees C. is a value measured by the same method as described above.

Examples of the methacrylate include monomethacrylate, dimethacrylate, and trifunctional or higher methacrylate. Among these methacrylates, dimethacrylate is preferable in terms of easy availability and mechanical properties of a cured product.

The dimethacrylate is preferably at least one selected from ethylene glycol dimethacrylate (n=1), diethylene glycol dimethacrylate (n=2), and triethylene glycol dimethacrylate (n=3), which are represented by General formula (1) below.

General formula (1)

The mass ratio (a1:a2) between the content (a1) of the bisphenol-type methacrylate and the content (a2) of the low-viscosity monomer is preferably from 70:30 through 30:70 and more preferably from 60:40 through 40:60.

In general, a termination reaction during radical polymerization occurs between two molecules of growing radicals. As polymerization of a monomer component proceeds and a polymer is grown, the viscosity of the polymerization system increases and the speed of chain termination reaction becomes significantly low. Moreover, as the degree of polymerization of the polymer increases, the polymerization speed increases significantly. Hence, the present disclosure can suppress proceeding of a termination reaction during radical polymerization by satisfying a mass ratio (a1:a2) of from 70:30 through 30:70 between the content (a1) of the bisphenol-type methacrylate and the content (a2) of the low-viscosity monomer so as not to excessively reduce the mass ratio of the bisphenol-type methacrylate, i.e., so as not to excessively suppress the viscosity of the polymerization system until the middle term of the radical reaction.

In the present disclosure, the curing time needed until the storage modulus of the monomer components measured with a photorheometer device: MCR302 (available from Anton Paar GmbH) and a light source: EXECURE-H-1VC II (available from HOYA Corporation) at a wavelength of 385 nm at a maximum output of 400 mW at an intensity of 1 reaches 1 MPa is preferably 10 seconds or shorter.

It is preferable that the curing time needed until the storage modulus of the monomer components measured with a photorheometer at a wavelength of 385 nm reaches 1 MPa be 10 seconds or shorter, because it is possible to obtain a sufficient curability without reducing productivity of the MJ methods, and to obtain a cured product that has no hardness difference regardless of the positions of layers laminated, i.e., whether layers are upper layers or bottom layers in the layer lamination direction.

<Inorganic Filler>

The inorganic filler is not particularly limited and may be appropriately selected depending on the intended purpose. Examples of the inorganic filler include alumina, talc, silica, titania, zirconia, magnesium silicate, mica, glass fiber, glass bead, carbon black, carbon fiber, and aluminum ball. One of these inorganic fillers may be used alone or two or more of these inorganic fillers may be used in combination. Among these inorganic fillers, silica, alumina, titania, and zirconia are preferable.

It is preferable to reform the surface of the inorganic filler with a silane coupling agent.

The silane coupling agent is not particularly limited and may be appropriately selected depending on the intended purpose. Examples of the silane coupling agent include vinyl methoxysilane, vinyl ethoxysilane, 2-(3,4-epoxycyclohexyl)ethyl trimethoxysilane, 3-glycidoxypropylmethyl dimethoxysilane, 3-glycidoxypropyl trimethoxysilane, 3-glycidoxypropylmethyl diethoxysilane, 3-glycidoxypropyl triethoxysilane, styryl, p-styryl trimethoxysilane, 3-methacryloxylpropylmethyl dimethoxysilane, 3-methacryloxypropyl trimethoxysilane, 3-methacryloxypropylmethyl diethoxysilane, 3-methacryloxypropyl triethoxysilane, 3-acryloxypropyl trimethoxysilane, N-2-(aminoethyl)-3-aminopropylmethyl dimethoxysilane, N-2-(aminoethyl)-3-aminopropylmethyl dimethoxysilane, 3-aminopropyl trimethoxysilane, 3-aminopropyl triethoxysilane, 3-triethoxysilyl-N-(1,3-dimethyl-butylidene)propylamine, N-phenyl-3-aminopropyl trimethoxysilane, hydrochloride of N-(vinylbenzyl)-2-aminoethyl-3-aminopropyl trimethoxysilane, tris-(trimethoxysilylpropyl)isocyanurate, 3-ureidepropyl trialkoxysilane, 3-mercaptopropylmethyl dimethoxysilane, 3-mercaptopropyl trimethoxysilane, 3-isocyanate propyl triethoxysilane, and 3-trimethoxysilylpropyl succinic anhydride. One of these silane coupling agents may be used alone or two or more of these silane coupling agents may be used in combination.

Among these silane coupling agents, silane coupling agents containing an unsaturated double bond, such as vinylmethoxysilane, 3-methacryloxypropyl methyldimethoxysilane, and 3-acryloxypropyl trimethoxysilane are particularly preferable.

It is preferable that the inorganic filler have a spherical shape in terms of dispersibility and inkjet dischargeability. The "spherical shape" is not limited to a true spherical shape, but may include, for example, a spheroid or a polyhedron. For example, a particle of which longest diameter (longer diameter) from the center of the particle to the circumference of the particle has about double the length of the shortest diameter (shorter diameter) is encompassed within the "spherical shape" of the present disclosure, although this is non-limiting. The ratio between the shorter diameter and the longer diameter is preferably from 1:1 through 1:5 and more preferably from 1:1 through 1:2.

The volume average primary particle diameter of the inorganic filler is preferably 10 nm or greater but 500 nm or less and more preferably 100 nm or greater but 300 nm or less.

The volume average primary particle diameter can be measured by, for example, a dynamic light scattering method using ELS-Z available from Otsuka Electronics Co., Ltd. as the instrument and an inorganic filler dispersion liquid diluted a hundred-fold with 2-methoxy-1-methylethyl acetate.

In the present disclosure, the mass ratio (A:B) between the monomer components (A) and the inorganic filler (B) is from 90:10 through 40:60, preferably from 80:20 through 40:60, and more preferably from 70:30 through 50:50.

When the mass ratio (A:B) between the monomer components (A) and the inorganic filler (B) is from 90:10 through 40:60, it is possible to ensure a good inkjet dischargeability and produce a cured products that has a high elastic modulus, a high strength, and a high hardness.

<Polymerization Initiator>

As the polymerization initiator, an arbitrary substance that produces radicals when irradiated with light (particularly, ultraviolet rays having a wavelength of from 220 nm through 400 nm) may be used.

Examples of the polymerization initiator include acetophenone, 2,2-diethoxyacetophenone, p-dimethylamino acetophenone, benzophenone, 2-chlorobenzophenone, p,p'-chlorobenzophenone, p,p-bisdiethylamino benzophenone, Michler's ketone, benzyl, benzoin, benzoin methyl ether, benzoin ethyl ether, benzoin isopropyl ether, benzoin-n-propyl ether, benzoin isobutyl ether, benzoin-n-butyl ether, benzylmethyl ketal, thioxanthone, 2-chlorothioxanthone, 2-hydroxy-2-methyl-1-phenyl-1-one, 1-(4-isopropylphenyl) 2-hydroxy-2-methyl propan-1-one, methylbenzoyl formate, 1-hydroxycyclohexyl phenyl ketone, azobis isobutyronitrile, benzoyl peroxide, and di-tert-butyl peroxide. One of these polymerization initiators may be used alone or two or more of these polymerization initiators may be used in combination.

The content of the polymerization initiator is preferably 0.1% by mass or greater but 10.0% by mass or less and more preferably 1.0% by mass or greater but 5.0% by mass or less relative to the total amount of the inkjet active-energy-ray-curable composition.

<Other Components>

The other components are not particularly limited and may be appropriately selected depending on the intended purpose. Examples of the other components include a surfactant, a polymerization inhibitor, a coloring material, a viscosity modifier, an antioxidant, an age resistor, a cross-linking accelerator, an ultraviolet absorbent, a plasticizer, a preservative, a solvent, and a dispersant.

—Surfactant—

The surfactant is preferably, for example, a compound having a molecular weight of 200 or greater but 5,000 or less. Specific examples of the surfactant include PEG-type nonionic surfactants [e.g., adduct of nonylphenol with from 1 mole through 40 moles of ethylene oxide (hereinafter, abbreviated as EO), and adduct of stearic acid with from 1 mole through 40 moles of EO], polyvalent alcohol-type nonionic surfactants (e.g., sorbitan palmitic acid monoester, sorbitan stearic acid monoester, and sorbitan stearic acid triester), fluorine-containing surfactants (e.g., adduct of perfluoroalkyl with from 1 mole through 50 moles of EO, perfluoroalkyl carboxylate, and perfluoroalkyl betaine), and modified silicone oils [e.g., polyether-modified silicone oils and (meth)acrylate-modified silicone oils]. One of these surfactants may be used alone or two or more of these surfactants may be used in combination.

—Polymerization Inhibitor—

Examples of the polymerization inhibitor include phenol compounds [e.g., hydroquinone, hydroquinone monomethyl ether, 2,6-di-t-butyl-p-cresol, 2,2-methylene-bis-(4-methyl-6-t-butylphenol), and 1,1,3-tris-(2-methyl-4-hydroxy-5-t-butylphenyl)butane], sulfur compounds [e.g., dilauryl thiodipropionate], phosphorus compounds [e.g., triphenyl phosphite], and amine compounds [e.g., phenothiazine]. One of these polymerization inhibitors may be used alone or two or more of these polymerization inhibitor may be used in combination.

—Coloring Material—

As the coloring material, dyes or pigments that dissolve or stably disperse in the inkjet active-energy-ray-curable composition and have an excellent thermal stability are suitable. Among these coloring materials, solvent dyes are preferable. For, for example, color adjustment, two or more coloring materials may be mixed appropriately.

<Method for Preparing Inkjet Active-Energy-Ray-Curable Composition>

The inkjet active-energy-ray-curable composition can be prepared by using the components described above. The preparation devices and conditions are not particularly limited. For example, the inkjet active-energy-ray-curable-composition can be prepared by subjecting the bisphenol-type methacrylate, the low-viscosity monomer, the inorganic filler, and the other components to a dispersion treatment using a dispersing machine such as a ball mill, a kitty mill, a disk mill, a pin mill, and a DYNO-MILL.

[Properties of Inkjet Active-Energy-Ray-Curable Composition]

Considering, for example, dischargeability from nozzles, it is preferable that an inkjet active-energy-ray-curable composition that can be suitably used in an inkjet method have a low viscosity. Therefore, in an embodiment, the viscosity of the inkjet active-energy-ray-curable composition of the present disclosure is preferably 600 mPa·s or lower, more preferably 300 mPa·s or lower, and yet more preferably 200 mPa·s or lower at 25 degrees C. In terms of dischargeability and object production accuracy, the viscosity of the inkjet active-energy-ray-curable composition is preferably 10 mPa·s or higher at 25 degrees C. During object production, it is possible to adjust the viscosity of the inkjet active-energy-ray-curable composition by adjusting the temperatures of the inkjet head and the flow path.

For example, the viscosity can be measured with, for example, a cone plate rotary viscometer VISCOMETER TVE-22L available from Toki Sangyo Co., Ltd. using a cone rotor (1°34'×R24) at a rotation number of 50 rpm at a hemathermal circulating water temperature of 25 degrees C.

It is preferable that the active-energy-ray-curable composition that can be used in inkjet applications have a static surface tension of 20 mN/m or higher but 40 mN/m or lower at 25 degrees C. in terms of discharging stability and object production accuracy.

The static surface tension can be measured by a routine method. Examples of the method include a plate method, a ring method, and a pendant drop method.

The inkjet active-energy-ray-curable composition of the present disclosure can be suitably used for inkjet applications, particularly, production of a three-dimensional object by inkjet. Hence, the present disclosure also includes the three-dimensional object produced using the inkjet active-energy-ray-curable composition of the present disclosure.

(Three-Dimensional Object Producing Method and Three-Dimensional Object Producing Apparatus)

A three-dimensional object producing method of the present disclosure includes a discharging step of discharging the inkjet active-energy-ray-curable composition of the present disclosure and a curing step of curing the discharged inkjet active-energy-ray-curable composition by irradiation with active energy rays, and further includes other steps as needed.

A three-dimensional object producing apparatus of the present disclosure includes a discharging unit configured to discharge the inkjet active-energy-ray-curable composition of the present disclosure and a curing unit configured to cure the discharged inkjet active-energy-ray-curable composition by irradiation with active energy rays, and further includes other units as needed.

<Discharging Step and Discharging Unit>

The discharging step is a step of discharging the inkjet active-energy-ray-curable composition of the present disclosure, and is performed by the discharging unit.

The discharging unit is a unit configured to discharge the inkjet active-energy-ray-curable composition of the present disclosure.

In the discharging step, it is preferable to discharge the inkjet active-energy-ray-curable composition of the present disclosure by an inkjet method onto a stage having a lifting function. The inkjet active-energy-ray-curable composition discharged onto the stage forms a liquid film.

<Curing Step and Curing Unit>

The curing step is a step of curing the discharged inkjet active-energy-ray-curable composition by irradiation with active energy rays.

The curing unit is a unit configured to cure the discharged inkjet active energy-ray-curable composition by irradiation with active energy rays.

In the curing step, a liquid film formed of the inkjet active-energy-ray-curable composition formed on the stage cures through irradiation with active energy rays.

—Active Energy Rays—

Active energy rays used for curing the inkjet active-energy-ray-curable composition are preferably light, particularly, ultraviolet rays having a wavelength of 220 nm or longer but 400 nm or shorter, and are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

In the three-dimensional object producing method of the present disclosure, a three-dimensional object having a desired shape is produced through sequential repetition of the discharging step and the curing step.

The three-dimensional object producing method and the three-dimensional object producing apparatus when the inkjet active-energy-ray-curable composition of the present disclosure is used as a model part forming material will be described below.

Figure 1:
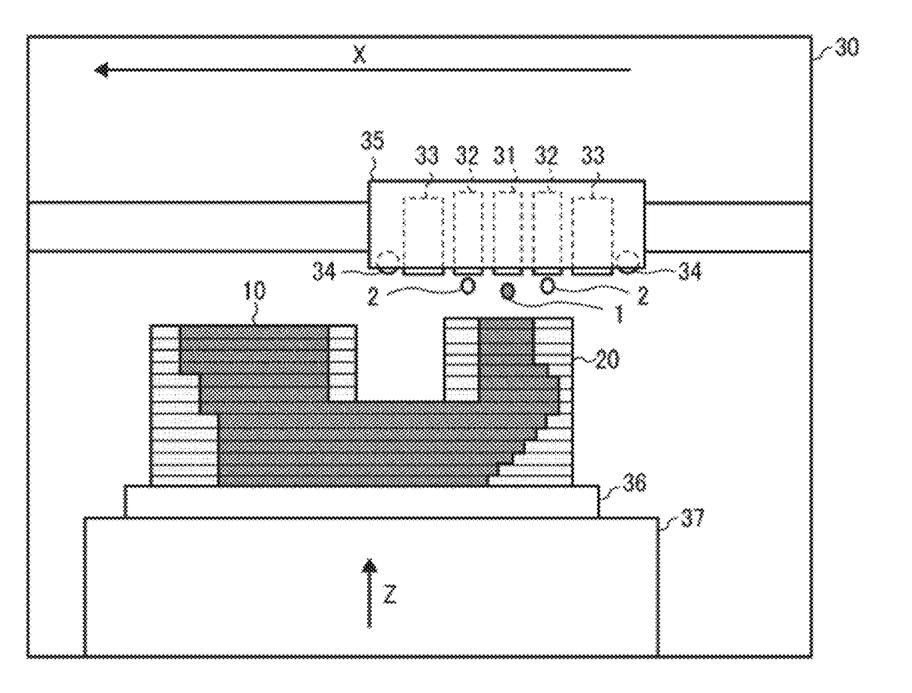
The Figure is a schematic view illustrating an example of a three-dimensional object producing apparatus of the present disclosure.

The Figure is a schematic view illustrating an example of the three-dimensional object producing apparatus of the present disclosure. The three-dimensional object producing apparatus 30 of the Figure includes head units 31 and 32, ultraviolet irradiators 33, rollers 34, a carriage 35, and a stage 37. The head unit 31 is configured to discharge a model part forming material 1. The head units 32 are configured to discharge a support part forming material 2. The ultraviolet irradiators 33 are configured to cure the discharged model part forming material 1 and support material forming material 2 by irradiation with ultraviolet rays. The rollers 34 are configured to smooth a liquid film of the model part forming material 1 and the support part forming material 2. The carriage 35 is configured to reciprocably move each unit such as the head units 31 and 32 in the X direction in the Figure. The stage 37 is configured to move a substrate 36 in the Z direction illustrated in the Figure and in the Y direction, which is the direction perpendicular to the sheet of the Figure. Instead of the stage 37, the carriage 35 may move in the Y direction.

When there are a plurality of model part forming materials color by color, the three-dimensional object producing apparatus 30 may include a plurality of head units 31 configured to discharge the model part forming materials of these colors. As the nozzles of the head units 31 and 32, nozzles of a known inkjet printer can be suitably used.

Examples of the metal that can be used for the rollers 34 include SUS300 series, SUS400 series, SUS600 series, hexavalent chromium, silicon nitride, and tungsten carbide. Moreover, any of these metals may be coated with, for example, fluorine or silicone and used for the rollers 34. Among these metals, SUS600 series is preferable in terms of strength and processability.

When using the rollers 34, the three-dimensional object producing apparatus 30 laminates layers while moving the stage 37 downward in accordance with the number of layers laminated, in order to maintain a constant gap between the rollers 34 and the surface of the object. It is preferable that the rollers 34 adjoin the ultraviolet irradiators 33.

In order to prevent drying of the ink during suspension, the three-dimensional object producing apparatus 30 may include a unit such as a cap configured to block the nozzles of the head units 31 and 32. In order to prevent nozzle clogging during a continuous use for a long time, the three-dimensional object producing apparatus 30 may include a maintenance mechanism configured to maintain the heads.

The object producing steps performed by the three-dimensional object producing apparatus of the present disclosure will be described below.

The engine of the three-dimensional object producing apparatus 30 causes the head unit 31 to discharge liquid droplets of the model part forming material 1 and the head units 32 to discharge liquid droplets of the support part forming material 2 based on two-dimensional data representing a bottommost cross-section among input two-dimensional data while moving the carriage 35 or the stage 37. As a result, the liquid droplets of the model part forming material 1 are disposed at the positions corresponding to the pixels representing the model part in the two-dimensional data representing the bottommost cross-section, and the liquid droplets of the support part forming material 2 are disposed at the positions corresponding to the pixels representing the support part, to form a liquid film in which liquid droplets at the adjoining positions contact each other. When forming one object, the three-dimensional object producing apparatus 30 forms a liquid film having a cross-sectional shape in the center of the stage 37. When forming a plurality of objects, the three-dimensional object producing apparatus 30 may form liquid films of a plurality of cross-sectional shapes on the stage 37, or may stack liquid films on an object formed earlier.

It is preferable to install heaters in the head units 31 and 32. It is also preferable to install pre-heaters on the path through which the model part forming material is supplied to the head unit 31 and on the path through which the support part forming material is supplied to the head units 32.

In the smoothing step, the rollers 34 scrap away excessive portions of the model part forming material and support part forming material discharged on the stage 37, to smooth any bosses and recesses of the liquid film or layer formed of the model part forming material and the support part forming material. The smoothing step may be performed each time one layer is laminated in the Z axis direction or may be performed once every time two to fifty layers are laminated. In the smoothing step, the rollers 34 may be stopped, or may be rotated at a positive or negative relative speed with respect to the travelling direction of the stage 37. The rotation speed of the rollers 34 may be constant, or constant acceleration, or constant deceleration. The rotation number of the rollers 34 expressed as the absolute value of the relative speed with respect to the stage 37 is preferably 50 mm/s or greater but 400 mm/s or less. When the relative speed is extremely low, smoothing is insufficient and smoothness is spoiled. When the relative speed is extremely high, the apparatus needs size increase, and the liquid droplets discharged tend to come out of place due to, for example, vibration. As a result, smoothness may be reduced. In the smoothing step, it is preferable that the rotation direction of the rollers 34 be opposite to the travelling direction of the head units 31 and 32.

In the curing step, the engine of the three-dimensional object producing apparatus 30 causes the carriage 35 to move the ultraviolet irradiators 33 to irradiate the liquid film formed in the discharging step with ultraviolet rays corresponding to the wavelength of the photopolymerization initiator contained in the model part forming material and the support part forming material. In this way, the three-dimensional object producing apparatus 30 cures the liquid film and forms a layer.

After the bottommost layer is formed, the engine of the three-dimensional object producing apparatus 30 lowers the stage by a distance corresponding to one layer.

The engine of the three-dimensional object producing apparatus 30 causes liquid droplets of the model part forming material 1 and liquid droplets of the support part forming material 2 to be discharged based on two-dimensional image data representing the second cross-section from the bottommost side while moving the carriage 35 and the stage 37. The discharging method is the same as when the bottommost liquid film is formed. As a result, a liquid film having the cross-sectional shape represented by the second two-dimensional data from the bottommost side is formed on the bottommost layer. Then, the engine of the three-dimensional object producing apparatus 30 causes the carriage 35 to move the ultraviolet irradiators 33 to irradiate the liquid film with ultraviolet rays, to cure the liquid film and form the second layer from the bottommost side on the bottommost layer.

The engine of the three-dimensional object producing apparatus 30 repeats formation and curing of a liquid film in the same manner as described above, using the input two-dimensional data in the order of the data closer to the bottommost side, to laminate layers. The number of times of repetition is different depending on, for example, the number of input two-dimensional image data, or the height and shape of the three-dimensional model. When object formation using all two-dimensional image data is completed, an object formed of a model part in a state of being supported by a support part is obtained.

The object produced by the three-dimensional object producing apparatus 30 includes a model part and a support part. The support part is removed from the object after object formation. Examples of the removing method include physical removal and chemical removal. In physical removal, a mechanical force is applied for removal. On the other hand, in chemical removal, the object is dipped in a solvent to disintegrate and remove the support part. The method for removing the support part is not particularly limited, but chemical removal is preferred because physical removal may break the object. Moreover, when taking costs into consideration, the removing method by water dipping is more preferred. When the removing method by water dipping is employed, a support part forming material of which cured product has water disintegrability is selected.

<Stored Container>

A stored container contains the inkjet active-energy-ray-curable composition. For example, a container that stores the inkjet active-energy-ray-curable composition can be used as cartridge or a bottle. Therefore, users can avoid direct contact with the inkjet active-energy-ray-curable composition during operations such as transfer or replacement, so that fingers and clothes are prevented from contamination. Furthermore, inclusion of foreign matters such as dust in the inkjet active-energy-ray-curable composition can be prevented. In addition, the container can be of any size, any form, and any material. For example, the container can be designed to a particular application. It is preferable to use a light blocking material to block the light or cover a container with a light blocking sheet, etc.

A three-dimensional object produced by the three-dimensional object producing method of the present disclosure and the three-dimensional object producing apparatus of the present disclosure has biocompatibility, and has a high elastic modulus, a high strength, and a high hardness at the same time as described below. Therefore, the three-dimensional object can be suitably used as, for example, dental materials such as inlays, crowns, dentures, artificial tooth, and implants.

The Vickers hardness of the three-dimensional object is preferably 23 or greater, more preferably 26 or greater, and yet more preferably 35 or greater.

The Vickers hardness can be measured based on, for example, a procedure according to JIS Z2244.

The bending strength of the three-dimensional object is preferably 80 MPa or greater, more preferably 100 MPa or greater, and yet more preferably 120 MPa or greater.

The bending strength is measured with a universal tester (autograph, model No. AG-I, available from Shimadzu Corporation), a 1 kN load cell, and a three-point bending jig. Stress when the distance between fulcra is set to 24 mm and the load point is displaced at a speed of 1 mm/minute is plotted with respect to strain. The stress at the breaking point can be regarded as the maximum stress.

EXAMPLES

The present disclosure will be described below by way of Examples. The present disclosure should not be construed as being limited to these Examples.

Example 1

Ethoxylated bisphenol A dimethacrylate (product name: BPE-100/D-2.6E, obtained from Shin-Nakamura Chemical Co., Ltd.) (56.0 parts by mass), triethylene glycol dimethacrylate (product name: NK ESTER 3G, obtained from Shin-Nakamura Chemical Co., Ltd.) (24.0 parts by mass), and an inorganic filler (silica, product name: ADMAFINE 3SM-C11, with a volume average primary particle diameter of 300 nm, obtained from Admatechs Co., Ltd.) (20.0 parts by mass) were mixed. Next, as a photopolymerization initiator, diphenyl (2,4,6-trimethyl benzoyl)phosphine oxide (product name: OMNIRAD TPO H, obtained from BASF GmbH) (4.0 parts by mass) was added and mixed with the resultant. Subsequently, the resultant was filtrated through a filter (product name: CCP-FX-C1B, obtained from Advantech Co., Ltd., with an average pore diameter of 3 micrometers), to obtain an inkjet active-energy-ray-curable composition of Example 1.

Examples 2 to 10 and Comparative Examples 1 to 5

Inkjet active-energy-ray-curable compositions of Examples 2 to 10 and Comparative Examples 1 to 5 were obtained in the same manner as in Example 1, except that unlike in Example 1, the components and the contents were changed as presented in Table 1 to Table 3.

Next, various properties of each of the obtained inkjet active-energy-ray-curable compositions were evaluated in the manners described below. The results are presented in Table 1 to Table 3.

<Method for Measuring Viscosity>

Each inkjet active-energy-ray-curable composition was measured with a cone plate rotary viscometer (VISCOMETER TVE-22L, obtained from Toki Sangyo Co., Ltd.) and evaluated according to the criteria described below. The temperature in the measuring chamber was fixed at 25 degrees C. using a high-temperature circulation tank, and a cone rotor (1°34'×R24) was used as a rotor.

[Evaluation Criteria]

A: The viscosity at 25 degrees C. was 300 mPa·s or lower.

B: The viscosity at 25 degrees C. was higher than 300 mPa·s but 600 mPa·s or lower.

C: The viscosity at 25 degrees C. was higher than 600 mPa·s.

<Dispersibility>

After the inorganic filler was dispersed, each inkjet active-energy-ray-curable composition was diluted a hundred-fold with the monomers used. Presence or absence of settling of particles on the bottom of a glass bottle was observed visually, and dispersibility was evaluated according to the criteria described below.

[Evaluation Criteria]

A: No settling occurred within 3 or more days.

B: No settling occurred within 1 or more but less than 3 days.

C: Settling occurred within less than 1 day.

<Three-Dimensional Object Production>

Each inkjet active-energy-ray-curable composition was filled in a tank leading to an inkjet head (MH2810, obtained from Ricoh Company, Ltd.) of a three-dimensional object producing apparatus, and discharged onto a base material from the inkjet head. Next, each inkjet active-energy-ray-curable composition discharged on the base material was irradiated and cured with a light volume of 300 mJ/cm$^2$ using an ultraviolet irradiator (obtained from Ushio Inc., UNIJET E110Z HD, with a wavelength of 385 nm). Through repetition of this process, a rectangular three-dimensional object having a size of 10 mm×40 mm×1 mm was produced.

<Vickers Hardness (HV 0.2)>

The Vickers hardness of each obtained three-dimensional object was measured based on a procedure according to JIS Z2244, and evaluated according to the criteria described below. The ratings C, B, and A are practically usable levels.

[Evaluation Criteria]

A: The Vickers hardness was 35 or greater.

B: The Vickers hardness was 26 or greater but less than 35.

C: The Vickers hardness was 22 or greater but less than 26.

D: The Vickers hardness was less than 22.

<Method for Measuring Bending Strength>

The bending strength of each obtained three-dimensional object was measured in the manner described above. For measurement of the bending strength of each three-dimensional object, a universal tester (autograph, model No. AG-I, obtained from Shimadzu Corporation), a 1 kN load cell, and a three-point bending jig were used. Stress when the distance between fulcra was set to 24 mm and the load point was displaced at a speed of 1 mm/minute was plotted with respect to strain. The stress at the breaking point was used as the maximum stress. The ratings B and A are practically usable levels.

[Evaluation Criteria]

A: The bending strength was 120 MPa or greater.

B: The bending strength was 100 MPa or greater but less than 120 MPa.

C: The bending strength was 80 MPa or greater but less than 100 MPa.

D: The bending strength was less than 80 MPa.

TABLE 1

| Components (part by mass) | | Ex. 1 | Ex. 2 | Ex. 3 | Ex. 4 | Ex. 5 |
|---|---|---|---|---|---|---|
| (A) Bisphenol-type methacrylate | a1 BPE-100/D-2.6E | 56.0 | 63.0 | 63.0 | 63.0 | |
| | BPE-500 | | | | | 56.0 |
| Low-viscosity monomer | a2 NK ESTER 1G | | | | | |
| | NK ESTER 2G | | | | | |
| | NK ESTER 3G | 24.0 | 27.0 | 27.0 | 27.0 | 24.0 |
| Any other methacrylate | EDMA | | | | | |
| Acrylate | A-BPE-4 | | | | | |
| | APG-200 | | | | | |
| (B) Inorganic filler | ADMAFINE 3SM-C11 | 20.0 | | | 10.0 | 20.0 |
| | ADMANANO YA-100CSM2 | | 10.0 | | | |
| | ADMANANO YA-10CSM1 | | | | | |
| | ADMAFINE SC2500-SMJ | | | 10.0 | | |
| | PT-401L | | | | | |
| | ADMAFINE AO-502 | | | | | |
| Any other filler | Silane-treated barium glass | | | | | |
| Polymerization initiator | Camphorquinone | | | | | |
| | PDE | | | | | |
| | OMNIRAD TPO H | 4.0 | 4.0 | 4.0 | 4.0 | 4.0 |
| Total (part by mas) | | 104.0 | 104.0 | 104.0 | 104.0 | 104.0 |
| Mass ratio (A:B) | | 80:20 | 90:10 | 90:10 | 90:10 | 80:20 |
| Mass ratio (a1:a2) | | 70:30 | 70:30 | 70:30 | 70:30 | 70:30 |
| Evaluation results | Viscosity (mPa·s, 25° C.) | 250 / A | 380 / B | 151 / A | 155 / A | 280 / A |
| | Vickers hardness (HV 0.2) | 27 / B | 23 / C | 23 / C | 22 / C | 23 / C |
| | Bending strength (MPa) | 128 / A | 106 / B | 121 / A | 110 / B | 113 / B |
| | Dispersibility | A | A | A | A | B |

TABLE 2

| Components (part by mass) | | Ex. 6 | Ex. 7 | Ex. 8 | Ex. 9 | Ex. 10 |
|---|---|---|---|---|---|---|
| (A) Bisphenol-type methacrylate | a1 BPE-100/D-2.6E | 12.0 | 30.0 | 36.0 | 56.0 | 56.0 |
| | BPE-500 | | | | | |
| Low-viscosity monomer | a2 NK ESTER 1G | | | | | |
| | NK ESTER 2G | | 30.0 | 24.0 | | |
| | NK ESTER 3G | 28.0 | | | 24.0 | 24.0 |
| Any other methacrylate | EDMA | | | | | |
| Acrylate | A-BPE-4 | | | | | |
| | APG-200 | | | | | |
| (B) Inorganic filler | ADMAFINE 3SM-C11 | 60.0 | | | | |
| | ADMANANO YA-100CSM2 | | 40.0 | 40.0 | | |
| | ADMANANO YA-10CSM1 | | | | | |
| | ADMAFINE SC2500-SMJ | | | | | |
| | PT-401L | | | | 20.0 | |
| | ADMAFINE AO-502 | | | | | 20.0 |
| Any other filler | Silane-treated barium glass | | | | | |
| Polymerization initiator | Camphorquinone | | | | | |
| | PDE | | | | | |
| | OMNIRAD TPO H | 4.0 | 4.0 | 4.0 | 4.0 | 4.0 |
| Total (part by mas) | | 104.0 | 104.0 | 104.0 | 104.0 | 104.0 |
| Mass ratio (A:B) | | 40:60 | 60:40 | 60:40 | 80:20 | 80:20 |
| Mass ratio (a1:a2) | | 30:70 | 50:50 | 60:40 | 70:30 | 70:30 |
| Evaluation results | Viscosity (mPa·s, 25° C.) | 240 / A | 290 / A | 520 / B | 375 / B | 410 / B |
| | Vickers hardness (HV 0.2) | 42 / A | 35 / A | 35 / A | 27 / B | 26 / B |
| | Bending strength (MPa) | 110 / B | 120 / A | 168 / A | 114 / B | 110 / B |
| | Dispersibility | A | A | A | B | B |

TABLE 3

| Components (part by mass) | | Comp. Ex. 1 | Comp. Ex. 2 | Comp. Ex. 3 | Comp. Ex. 4 | Comp. Ex. 5 |
|---|---|---|---|---|---|---|
| (A) Bisphenol-type methacrylate | a1 BPE-100/D-2.6E | 56.0 | | 50.0 | | |
| | BPE-500 | | | | | |
| Low-viscosity monomer | a2 NK ESTER 1G | | | | | |
| | NK ESTER 2G | | | | | |
| | NK ESTER 3G | | 24.0 | 30.0 | | 24.0 |
| Any other methacrylate | EDMA | | 56.0 | 20.0 | | |
| Acrylate | A-BPE-4 | | | | 56.0 | 56.0 |
| | APG-200 | 24.0 | | | 24.0 | |
| (B) Inorganic filler | ADMAFINE 3SM-C11 | 20.0 | 20.0 | 20.0 | 20.0 | 20.0 |
| | ADMANANO YA-100CSM2 | | | | | |
| | ADMANANO YA-10CSM1 | | | | | |
| | ADMAFINE SC2500-SMJ | | | | | |
| | PT-401L | | | | | |
| | ADMAFINE AO-502 | | | | | |

TABLE 3-continued

| Components (part by mass) | | Comp. Ex. | | | | |
|---|---|---|---|---|---|---|
| | | 1 | 2 | 3 | 4 | 5 |
| Any other filler | Silane-treated barium glass | | | 280.0 | | |
| Polymerization initiator | Camphor-quinone | | | 1.0 | | |
| | PDE | | | 1.0 | | |
| | OMNIRAD TPO H | 4.0 | 4.0 | | 4.0 | 4.0 |
| Total (part by mas) | | 104.0 | 104.0 | 402.0 | 104.0 | 104.0 |
| Mass ratio (A:B) | | 80:20 | 80:20 | 25:75 | 80:20 | 80:20 |
| Mass ratio (a1:a2) | | — | 24:56 | 50:30:20 | — | — |
| Evaluation results | Viscosity (mPa · s, 25° C.) | 310 | 130 | 600 or higher | 330 | 290 |
| | | B | A | C | B | A |
| | Vickers hardness (HV 0.2) | 19 D | 8 D | Unevaluable due to thickening and bubbles | 15 D | 20 D |
| | Bending strength (MPa) | 105 B | 54 D | | 85 C | 77 D |
| | Dispersibility | A | A | | A | A |

The details of the components presented in Table to Table 3 are as follows.

[Monomer Components]

—Bisphenol-Type Methacrylate—

BPE-100/D-2.6E: Ethoxylated bisphenol A dimethacrylate, obtained from Shin-Nakamura Chemical Co., Ltd., with a viscosity of 1,050 mPa·s at 25 degrees C.

BPE-500: Ethoxylated bisphenol A dimethacrylate, obtained from Shin-Nakamura Chemical Co., Ltd., with a viscosity of 450 mPa·s at 25 degrees C.

—Low-Viscosity Monomer—

NK ESTER 1G: Monoethylene glycol dimethacrylate, obtained from Shin-Nakamura Chemical Co., Ltd., with a viscosity of 3 mPa·s at 25 degrees C.

NK ESTER 2G: Diethylene glycol dimethacrylate, obtained from Shin-Nakamura Chemical Co., Ltd., with a viscosity of 5 mPa·s at 25 degrees C.

NK ESTER 3G: Triethylene glycol dimethacrylate, obtained from Shin-Nakamura Chemical Co., Ltd., with a viscosity of 9 mPa·s at 25 degrees C.

—Any Other Methacrylate—

EDMA: Erythritol dimethacrylate [1,4-bis(methacryloyloxy)-2,3-butanediol], obtained from Tokyo Chemical Industry Co., Ltd., with a viscosity of 480 mPa·s at 25 degrees C.

—Acrylate—

A-BPE-4: Ethoxylated bisphenol A diacrylate, obtained from Shin-Nakamura Chemical Co., Ltd., with a viscosity of 1,100 mPa·s at 25 degrees C.

APG-200: Tripropylene glycol diacrylate, obtained from Shin-Nakamura Chemical Co., Ltd., with a viscosity of 12 mPa·s at 25 degrees C.

[Inorganic Filler]

ADMAFINE 3SM-C11: Silica, with a volume average primary particle diameter of 300 nm, obtained from Admatechs Co., Ltd., with a spherical shape, methacrylate treatment with a silane coupling agent ADMANANO YA-100CSM2: Silica, with a volume average primary particle diameter of 100 nm, obtained from Admatechs Co., Ltd., with a spherical shape, methacrylate treatment with a silane coupling agent ADMANANO YA-10CSM1: Silica, with a volume average primary particle diameter of 10 nm, obtained from Admatechs Co., Ltd., with a spherical shape, methacrylate treatment with a silane coupling agent ADMAFINE S2500-SMJ: Silica, with a volume average primary particle diameter of 500 nm, obtained from Admatechs Co., Ltd., with a spherical shape, methacrylate treatment with a silane coupling agent PT-401L: Titania, with a volume average primary particle diameter of 130 nm, obtained from Ishihara Sangyo Kaisha, Ltd., with a spherical shape, surface non-treated ADMAFINE AO-502: Alumina, with a volume average primary particle diameter of 300 nm, obtained from Admatechs Co., Ltd., with a spherical shape, methacrylate treatment with a silane coupling agent The volume average primary particle diameters of the inorganic fillers described above were values measured by a dynamic light scattering method. ELS-Z obtained from Otsuka Electronics Co., Ltd. was used as the instrument, and an inorganic filler dispersion liquid diluted a hundred-fold with 2-methoxy-1-methylethyl acetate was measured.

—Any Other Filler—

Silane-treated barium glass: with an average particle diameter of 2,400 nm, barium glass (obtained from Stec Co., Ltd., product code "RAYSORB E-3000") was ground with a ball mill, to obtain a barium glass powder. The average particle diameter of the obtained barium glass powder measured with a laser diffraction particle size analyzer (obtained from Shimadzu Corporation, model No. "SALD-2100") was 2.4 micrometers. The barium glass powder (100 parts by mass) was surface-treated with 3-methacryloyloxypropyl trimethoxysilane (3 parts by mass), to obtain silane-treated barium glass powder.

—Polymerization Initiator—

Camphorquinone: obtained from Tokyo Chemical Industry Co., Ltd.

PDE: Ethyl-4-dimethylaminobenzoate, a polymerization accelerator, obtained from Tokyo Chemical Industry Co., Ltd.

OMNIRAD TPO H: Diphenyl(2,4,6-trimethylbenzoyl) phosphine oxide, obtained from BASF GmbH From the results of Table 1 to Table 3, it was revealed that Examples 1 to 10 achieved a good inkjet dischargeability compared with Comparative Examples 1 to 5, and were able to produce three-dimensional objects that had a high elastic modulus, a high strength, and a high hardness at the same time.

From the result of Example 6, it was revealed that even though the content of the inorganic filler was 60% by mass, the inkjet active-energy-ray-curable composition was inkjet-dischargeable because the viscosity at 25 degrees C. was 240 mPa·s and low, and was able to achieve excellent mechanical properties including a Vickers hardness of 42 and a bending elastic modulus of 110 MPa.

As compared, from the result of Comparative Example 1, it was revealed that the Vickers hardness was low when a diacrylate was used instead of a dimethacrylate as the low-viscosity monomer.

From the result of Comparative Example 2, it was revealed that the Vickers hardness was low when any other non-bisphenol-type methacrylate was used instead of a bisphenol-type methacrylate.

From the result of Comparative Example 3, it was revealed that when an inorganic filler having a large particle diameter of a dental grade was added in a large amount, it was impossible to measure the Vickers hardness, the bending strength, and dispersibility because the viscosity was extremely high and bubbles could not be removed. The obtained composition failed to be an inkjet active-energy-ray-curable composition.

From the result of Comparative Example 4, it was revealed that when ethoxylated bisphenol A diacrylate and diacrylate were used as the monomer components, the Vickers hardness and the bending strength were low.

From the result of Comparative Example 5, it was revealed that when ethoxylated bisphenol A diacrylate was used instead of ethoxylated bisphenol A dimethacrylate, the Vickers hardness and the bending strength were low.

Aspects of the present disclosure are, for example, as follows.

<1> An inkjet active-energy-ray-curable composition, including:
monomer components including a bisphenol-type methacrylate and a low-viscosity monomer; and
an inorganic filler.

<2> The inkjet active-energy-ray-curable composition according to <1>,
wherein a mass ratio (A:B) between a content (A) of the monomer components and a content (B) of the inorganic filler is from 90:10 through 40:60.

<3> The inkjet active-energy-ray-curable composition according to <1> or <2>,
wherein the low-viscosity monomer is at least one selected from the group consisting of ethylene glycol dimethacrylate (n=1), diethylene glycol dimethacrylate (n=2), and triethylene glycol dimethacrylate (n=3), which are represented by General formula (1) below, General formula (1)

<4> The inkjet active-energy-ray-curable composition according to any one of <1> to <3>,
wherein the bisphenol-type methacrylate is ethoxylated bisphenol A-type dimethacrylate having a viscosity of 2,000 mPa·s or lower at 25 degrees C.

<5> The inkjet active-energy-ray-curable composition according to any one of <1> to <4>,
wherein a mass ratio (a1:a2) between the bisphenol-type methacrylate (a1) and the low-viscosity monomer (a2) is from 70:30 through 30:70.

<6> The inkjet active-energy-ray-curable composition according to any one of <1> to <5>,
wherein the inorganic filler is spherical particles having a volume average primary particle diameter of 10 nm or greater but 500 nm or less.

<7> The inkjet active-energy-ray-curable composition according to any one of <1> to <6>,
wherein the inorganic filler is at least one selected from the group consisting of silica, alumina, titania, and zirconia.

<8> The inkjet active-energy-ray-curable composition according to any one of <1> to <7>,
wherein a surface of the inorganic filler is reformed with a silane coupling agent.

<9> The inkjet active-energy-ray-curable composition according to any one of <1> to <8>,
wherein a curing time needed until a storage modulus of the monomer components measured with a photorheometer at a wavelength of 385 nm reaches 1 MPa is 10 seconds or shorter.

<10> A three-dimensional object producing method, including:
discharging the inkjet active-energy-ray-curable composition according to any one of <1> to <9>; and
curing the inkjet active-energy-ray-curable composition discharged, by irradiation with active energy rays.

<11> A three-dimensional object producing apparatus, including:
a discharging unit configured to discharge the inkjet active-energy-ray-curable composition according to any one of <1> to <9>; and
a curing unit configured to cure the inkjet active-energy-ray-curable composition discharged, by irradiation with active energy rays.

The inkjet active-energy-ray-curable composition according to any one of <1> to <9>, the three-dimensional object producing method according to <10>, and the three-dimensional object producing apparatus according to <11> can solve the various problems in the related art and achieve the object of the present disclosure.

What is claimed is:

1. An inkjet active-energy-ray-curable composition, comprising:
monomer components including a bisphenol-type methacrylate and a low-viscosity monomer; and
an inorganic filler,
wherein the inorganic filler is spherical particles having a volume average primary particle diameter of from 100 nm to 300 nm, and
wherein a mass ratio (A:B) between a content (A) of the monomer components and a content (B) of the inorganic filler is from 80:20 through 40:60.

2. The inkjet active-energy-ray-curable composition according to claim 1,
wherein the low-viscosity monomer is at least one selected from the group consisting of ethylene glycol dimethacrylate (n=1), diethylene glycol dimethacrylate (n=2), and triethylene glycol dimethacrylate (n=3), which are represented by General formula (1) below, General formula (1)

3. The inkjet active-energy-ray-curable composition according to claim 1,
wherein the bisphenol-type methacrylate is ethoxylated bisphenol A-type dimethacrylate having a viscosity of 2,000 mPa·s or lower at 25 degrees C.

4. The inkjet active-energy-ray-curable composition according to claim 1,
wherein a mass ratio (a1:a2) between the bisphenol-type methacrylate (a1) and the low-viscosity monomer (a2) is front 70:30 through 30:70.

5. The inkjet active-energy-ray-curable composition according to claim 1,
wherein the inorganic filler is at least one selected from the group consisting of silica, alumina, titania, and zirconia.

6. The inkjet active-energy-ray-curable composition according to claim 1,
wherein a surface of the inorganic filler is reformed with a silane coupling agent.

7. The inkjet active-energy-ray-curable composition according to claim 1,
wherein a curing time needed until a storage modulus of the monomer components measured with a photorheometer at a wavelength of 385 nm reaches 1 MPa is 10 seconds or shorter.

8. The inkjet active-energy-ray-curable composition according to claim 1, wherein a mass ratio (A:B) between a content (A) of the monomer components and a content (B) of the inorganic filler is from 70:30 through 50:50.

9. The inkjet active-energy-ray-curable composition according to claim 2, wherein the bisphenol-type methacrylate is ethoxylated bisphenol A-type dimethacrylate having a viscosity of 2,000 mPa·s or lower at 25 degrees C.

10. The inkjet active-energy-ray-curable composition according to claim 9, wherein a mass ratio (a1:a2) between the bisphenol-type methacrylate (a1) and the low-viscosity monomer (a2) is from 70:30 through 30:70.

11. The inkjet active-energy-ray-curable composition according to claim 10, wherein the inorganic filler is at least one selected from the group consisting of silica, alumina, titania, and zirconia.

12. The inkjet active-energy-ray-curable composition according to claim 1, wherein the content of the bisphenol-type methacrylate is 20% by mass to 70% by mass based on the total mass of the composition.

13. The inkjet active-energy-ray-curable composition according to claim 10, wherein the inorganic filler is silica, titania, or alumina, each treated with a silane coupling agent.

14. The inkjet active-energy-ray-curable composition according to claim 1, wherein the composition comprises 10 to 60% by mass of the filler.

15. The inkjet active-energy-ray-curable composition according to claim 1, wherein the composition comprises 20 to 60% by mass of the filler.

16. The inkjet active-energy-ray-curable composition according to claim 10, wherein the composition comprises 20 to 60% by mass of the filler.

17. A three-dimensional object producing method, comprising:
discharging the inkjet active-energy-ray-curable composition according to claim 1; and
curing the inkjet active-energy-ray-curable composition discharged, by irradiation with active energy rays.

* * * * *